(12) United States Patent
Guthrie et al.

(10) Patent No.: US 7,847,517 B2
(45) Date of Patent: *Dec. 7, 2010

(54) METHOD AND APPARATUS FOR HANDLING A CHARGING STATE IN A MOBILE ELECTRONIC DEVICE

(75) Inventors: Martin G. A. Guthrie, Mississauga (CA); Dusan Veselic, Oakville (CA); Alexei Skarine, Waterloo (CA); Michael F. Habicher, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/689,587

(22) Filed: Jan. 19, 2010

(65) Prior Publication Data
US 2010/0117595 A1 May 13, 2010

Related U.S. Application Data

(63) Continuation of application No. 11/026,590, filed on Dec. 30, 2004, now Pat. No. 7,679,316.

(60) Provisional application No. 60/545,433, filed on Feb. 17, 2004.

(51) Int. Cl.
*H02J 7/00* (2006.01)
(52) U.S. Cl. ........................... 320/107; 320/155
(58) Field of Classification Search .................. 320/107
See application file for complete search history.

(56) References Cited

U.S. PATENT DOCUMENTS 3,748,386 A 7/1973 Monney et al.

4,568,096 A 2/1986 Yew et al.

(Continued)

FOREIGN PATENT DOCUMENTS

EP 1198049 A1 4/2002

(Continued)

OTHER PUBLICATIONS

Guthrie, Martin G. A., et al.; U.S. Appl. No. 12/650,245, filed Dec. 30, 2009; U.S. Office Action dated Apr. 2, 2010; 6 pgs.

(Continued)

*Primary Examiner*—Edward Tso
*Assistant Examiner*—Arun Williams
(74) *Attorney, Agent, or Firm*—Conley Rose, P.C.; J. Robert Brown, Jr.

(57) ABSTRACT

A system and method for using a universal serial bus (USB) interface in a mobile device is provided that includes providing a battery charger operable to receive a voltage provided at the USB interface, the battery charger operable for charging a battery in the mobile device, and, a voltage regulator operable to receive a voltage provided at the USB interface, the voltage regulator used in powering the mobile device. The method also includes, detecting a USB bus voltage at the USB interface, measuring passage of a predetermined amount of time upon detecting the USB bus voltage, and disabling at least one of the voltage regulator and the battery charger if the predetermined amount of time expires before an enumeration acknowledgement signal is received at the USB interface.

7 Claims, 4 Drawing Sheets

U.S. PATENT DOCUMENTS

| | | |
|---|---|---|
| 5,250,891 A | 10/1993 | Glasgow |
| 5,959,368 A | 9/1999 | Kubo et al. |
| 6,031,362 A | 2/2000 | Bradley |
| 6,144,566 A | 11/2000 | Keller |
| 6,153,855 A | 11/2000 | Renner et al. |
| 6,211,647 B1 | 4/2001 | Wendelrup et al. |
| 6,211,649 B1 | 4/2001 | Matsuda |
| 6,357,011 B2 | 3/2002 | Gilbert |
| 6,507,172 B2 | 1/2003 | Sherman |
| 6,531,845 B2 | 3/2003 | Kerai et al. |
| 6,531,854 B2 | 3/2003 | Hwang |
| 6,573,768 B2 | 6/2003 | Hwang |
| 6,633,932 B1 | 10/2003 | Bork et al. |
| 6,650,089 B1 | 11/2003 | Freeman et al. |
| 6,671,814 B1 * | 12/2003 | Kubo et al. ............... 713/324 |
| 6,774,603 B2 | 8/2004 | Liao |
| 6,798,173 B2 | 9/2004 | Hsu |
| 6,812,971 B2 | 11/2004 | Terane |
| 6,833,686 B2 | 12/2004 | Veselic et al. |
| 6,883,715 B1 | 4/2005 | Fruhauf et al. |
| 6,936,936 B2 | 8/2005 | Fischer et al. |
| 6,946,817 B2 | 9/2005 | Fischer et al. |
| 7,170,259 B2 | 1/2007 | Veselic |
| 7,518,343 B2 | 4/2009 | Veselic et al. |
| 7,663,338 B2 | 2/2010 | Guthrie et al. |
| 2002/0154243 A1 * | 10/2002 | Fife et al. ............... 348/372 |
| 2003/0052547 A1 | 3/2003 | Fischer et al. |
| 2003/0054703 A1 | 3/2003 | Fischer et al. |
| 2003/0076138 A1 | 4/2003 | Hwang |
| 2003/0110403 A1 | 6/2003 | Crutchfield et al. |
| 2004/0239294 A1 | 12/2004 | Veselic et al. |
| 2004/0251878 A1 | 12/2004 | Veselic |

FOREIGN PATENT DOCUMENTS

| | | |
|---|---|---|
| WO | 9535593 A1 | 12/1995 |
| WO | 0120433 A1 | 3/2001 |

OTHER PUBLICATIONS

European Supplementary Search Report; EP Application No. 04802383.2; Feb. 8, 2010; 5 pgs.

Compaq, et al.; Universal Serial Bus Specification; Revision 1.0; Jan. 15, 1996; 149 pgs. Part 1.

Compaq, et al.; Universal Serial Bus Specification; Revision 1.0; Jan. 15, 1996; 119 pgs. Part 2.

Franc, Fabien; Title: Choosing a Power Supply, Automatically; Electrical Design News888; No. 24; Nov. 23 2000; 4 pgs.

Supplementary European Search Report; EP Application No. 04802384.0; Aug. 27, 2010; 4 pgs.

* cited by examiner

METHOD AND APPARATUS FOR HANDLING A CHARGING STATE IN A MOBILE ELECTRONIC DEVICE

CROSS-REFERENCE TO RELATED APPLICATIONS

This continuation application claims priority from U.S. patent application Ser. No. 11/026,590, filed Dec. 30, 2004 by Martin G. A. Guthrie, et al, entitled "Method and Apparatus for Handling a Charging State in a Mobile Electronic Device" (10978-US-PAT-4214-00702) and U.S. Provisional Application No. 60/545,433, filed Feb. 17, 2004 by Martin G. A. Guthrie, et al, entitled "Method and Apparatus for Handling a Charging State in a Mobile Electronic Device"(10978-US-PRV), which are incorporated by reference herein as if reproduced in their entirety.

BACKGROUND

The technology described in this patent document relates generally to mobile electronic devices. More particularly, the patent document relates to a method and apparatus for handling a charging state in a mobile electronic device.

Portable systems, such as mobile electronic devices, which are powered by rechargeable batteries have a problem supporting both USB (Universal Serial Bus) charging state and suspend state functions.

When a rechargeable battery is dead or not present, the mobile electronic device can not operate since it does not have any power. In order for the mobile electronic device to operate, the mobile electronic device is connected to a USB host in order to draw power from the host to both power up the device and recharge the battery. However, when the mobile electronic device is connected to the USB host, USB specifications require that the device initiate enumeration within 100 msec, hereon referred to as "VBUS detection". Enumeration is the process whereby the device requests permission from the USB host to access the host. In this case, the enumeration request is directed to a request for the mobile electronic device to draw a current/voltage from the USB host in order to power up the mobile electronic device as well as to recharge the dead or non-present battery.

In most cases, it is desired that a battery charger within the mobile electronic device turn on once it receives power from the USB host upon VBUS detection. This causes the battery charger to be enabled so that the current/voltage supplied by the USB host is used for operation of the device and recharging of the battery. This may be referred to as a device charging state. Therefore, when the voltage via the VBUS is applied, the battery charger is enabled and acts as a power source to power up the mobile electronic device and to recharge the battery.

Another common state for the mobile electronic device is a device suspend state. USB specifications require that the total current supplied by the USB host to the mobile electronic device does not exceed 500 µA in the device suspend state. With many mobile electronic devices, 500 µA is not enough current for the processor or CPU in the mobile electronic device to operate and therefore the device is generally powered down. Powering down of the CPU in the mobile electronic device causes all the control signals to default to a low state signal, which causes the battery charger to be enabled. However, since 500 µA is not enough current for operation of the device, it is not desirable for the battery charger to be enabled during the device suspend state. In some other prior art devices, support for the device suspend state is not recognized and the battery charger remains enabled during the device suspend state. In this manner, the 500 µA current limit is not recognized or acknowledged by the mobile electronic device even though it is required by USB specifications.

Furthermore, in some prior art devices, two separate signals to control the device charging state and the device suspend state are used.

It is, therefore, desirable to provide a method and apparatus for handling a charging state and a device suspend state in a mobile electronic device.

SUMMARY

In accordance with the teachings described herein, a method and apparatus for handling a charging state in a mobile electronic device is provided. A universal serial bus (USB) interface may be used for connecting the mobile device to a USB host. A processing device may be used to execute programs and to control operation of the mobile device, the processing device may be further operable to receive an enumeration acknowledgement signal from the USB host via the USB interface. A rechargeable battery may be used for powering the processing device. A voltage regulator may be coupled to the USB interface and operable to receive a USB bus voltage from the USB interface and use the USB bus voltage to power the processing device. A timing circuitry may be used to disable the voltage regulator from powering the processing device after a pre-determined amount of time has expired, the timing circuitry being operable to measure the passage of the pre-determined amount of time upon detecting the USB bus voltage. A battery charger may be used to receive the USB bus voltage from the USB interface and use the USB bus voltage to power the processing device and to charge the rechargeable battery. The processing device may enable the battery charger to power the processing device and to charge the rechargeable battery when the enumeration acknowledgement signal is received from the USB host.

BRIEF DESCRIPTION OF THE DRAWINGS

Embodiments of the present invention will now be described, by way of example only, with reference to the attached Figures, wherein.

DETAILED DESCRIPTION

Figure 1:
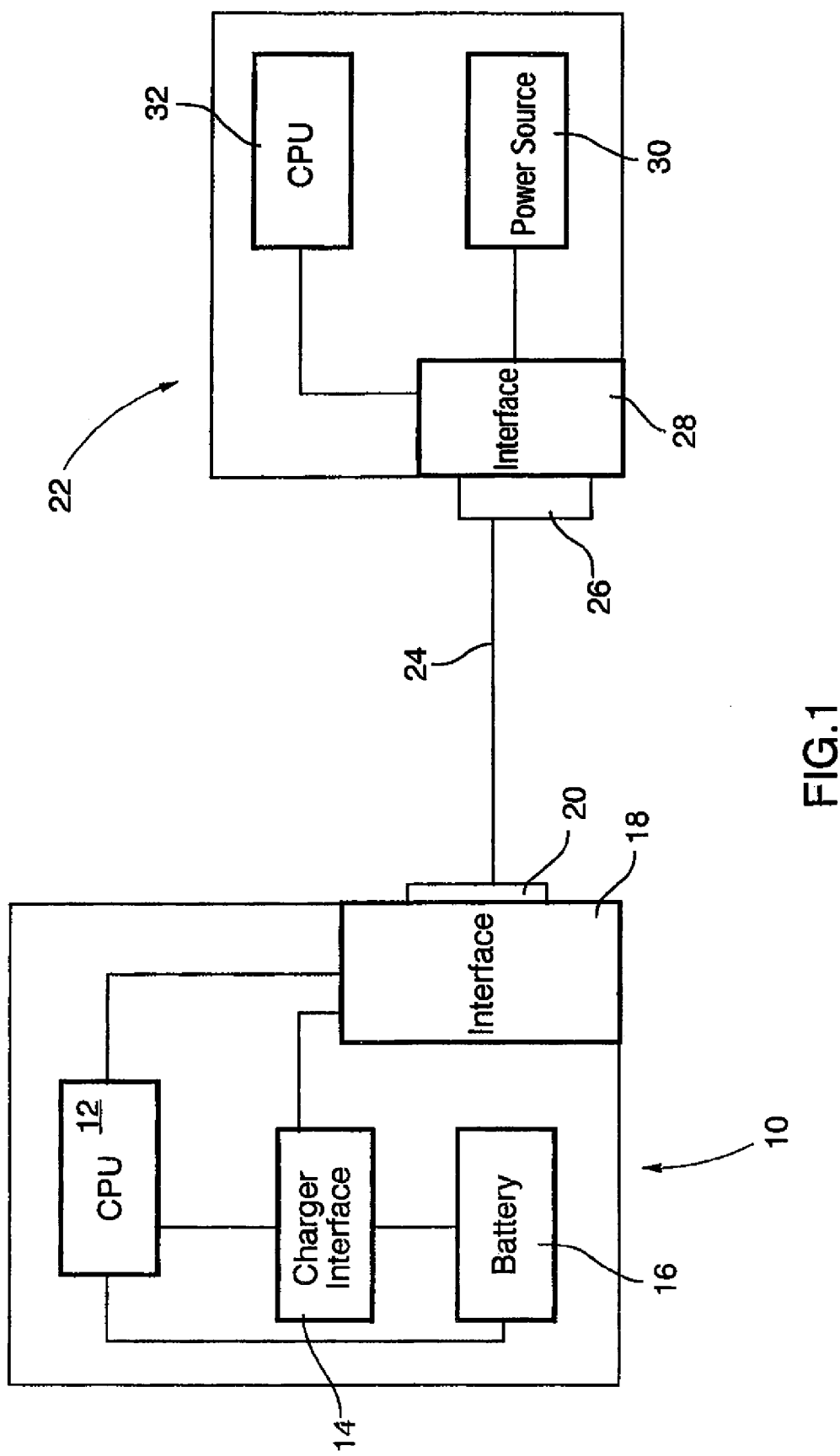
FIG. 1 is a schematic diagram of a mobile electronic device connected to a Universal Serial Bus (USB) host.

FIG. 1 is a schematic diagram of a mobile electronic device 10 connected to a Universal Serial Bus (USB) host 22. The mobile electronic device 10 includes a central processing unit (CPU) 12 that is coupled to a charger interface 14 which, in turn, is coupled to a rechargeable battery 16. The CPU 12 is also connected to the rechargeable battery 16 and to a USB interface 18 which is connected to a USB port 20. In addition, the charger interface 14 is connected to the USB interface 18.

The USB interface 18 interacts with the USB port 20 to receive data and power from and transmit data to the USB host 22.

During operation of the mobile electronic device 10, when a user determines that the rechargeable battery 16 is dead or not present, the user connects the mobile electronic device 10 to the USB host 22 via a USB cable 24. Within the USB cable 24 are four separate circuit lines: a power line, a ground line and two data lines. At the USB host 22, the USB cable 24 is connected to a USB host port 26. A device interface 28 is connected to the USB host port 26 for transmitting data and power to and receiving data from the mobile electronic device 10. The USB host 22 further includes a power source 30 and a USB host CPU 32 which are both connected to the device interface 28. The power source 30 provides the requested power, in the form of a current/voltage, to the mobile electronic device while the USB host CPU 32 acknowledges enumeration and transmits a device suspend state request or signal, when required.

Figure 2:
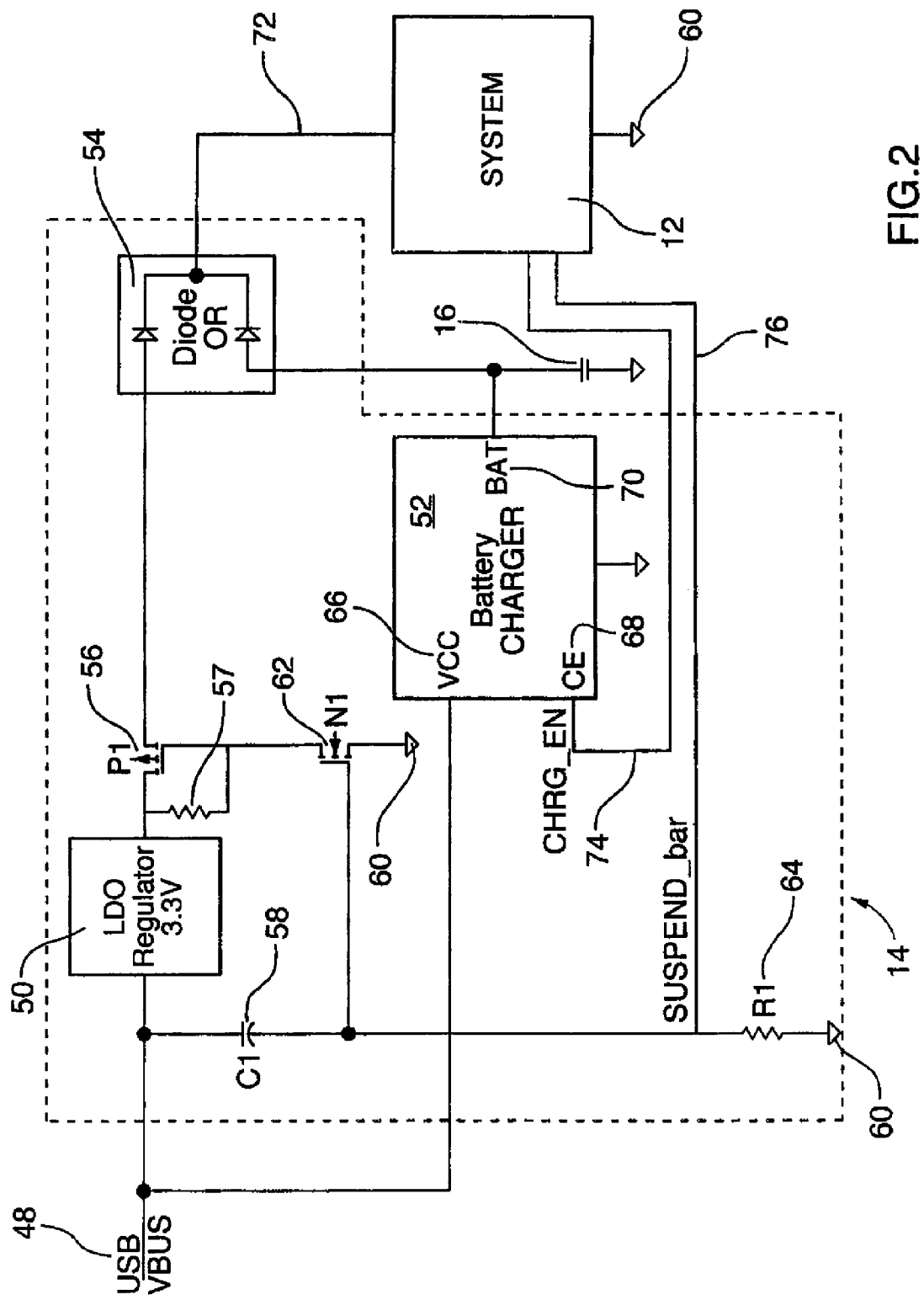
FIG. 2 is a schematic diagram of an example apparatus for handling a charging state in a mobile electronic device.

Turning to FIG. 2, a schematic diagram of an example apparatus for handling a device charging state, in the form of the charger interface, is shown. The charger interface 14, which receives a USB VBUS input 48, includes a low dropout (LDO) regulator 50, a battery charger 52 and a DIODE OR 54. The LDO regulator 50 is connected to the DIODE OR 54 via a P field effect transistor (PFET) 56 with a corresponding pull-up resistor 57. The interface 14 further includes a capacitor 58 which is connected to ground 60 via two separate paths. One path to ground is via an N field effect transistor (FET) 62 and a second path to ground is via a resistor 64. The PFET 56 is also connected to ground 60 via the NFET 62. The battery charger 52, including a Vcc port 66, a charger enable (CE) port 68 and a battery (BAT) port 70 connected to the rechargeable battery 16 and the DIODE OR 54. An output 72 of the DIODE OR 54 is connected to the system (e.g. the CPU) 12. A first output 74 from the CPU 12 is connected to the CE port 68 of the battery charger 52 for enabling and disabling the charger 52 while a second output 76 from the CPU 12 is connected to ground 60 via the resistor 64 along with the LDO regulator 50 via the capacitor 58. It should be understood that although the ports of the battery charger have been given specific labels, these labels are not meant to narrow the scope of the invention but to provide description as to the function of each port.

In operation, when the USB cable 24 is connected between the USB port 20 of the mobile electronic device 10 and the USB host port 26 of the USB host 22, the power source 30 transmits a current via the power line of the USB cable 24 to the charger interface 14 which is seen in FIG. 2 as the USB VBUS input 48. A continuous check is performed by the mobile electronic device until the rising edge of the input 48 is sensed.

After the rising edge of the input 48 has been sensed, the input 48 is transmitted to the Vcc port 66 of the battery charger 52, to the NFET 62 via the capacitor 58, and to the LDO regulator 50 in order to enable a battery charger power path and a LDO regulator power path (step 102). The capacitor 58 passes the rising edge of the VBUS input 48 to the gate of the NFET 62, which drives the NFET 62 to close the PFET 56 allowing the VBUS input 48 to through the LDO regulator 50 and the PFET 56 to the DIODE OR 54.

After receiving the VBUS input 48 at its Vcc port 66, the battery charger 52 may remain disabled until it receives instructions from the CPU 12 to enable. Transmission of the input 48 to ground 60 via the capacitor 58 and the resistor 64 enables a timer. The values of the capacitor 58 and the resistor 64 are selected so that they form a 100 msec timer as required by USB specifications.

A check is then performed to verify whether or not the timer has expired. If the timer has expired, the battery charger and LDO regulator power paths are disabled. Therefore, if the second output 76, seen as a high state signal, is not transmitted from the system 12 to the NFET 62 before the expiry of the 100 ms timer, the resister 60 drains the gate of the NFET 62 which causes the PFET 56 to close which, in turn, disables the power path provided by the LDO regulator 50 since the current from the PDO regulator flows through the pull-up resistor 57 to ground 60 instead of the PFET 56.

While the resistor 64 drains the port of the NFET 62, the CPU 12 transmits the first output 74, in the form of a low state signal, to the CE port 68 of the battery charger 52 to disable the power path provided by the battery charger 52.

However, if the timer has not expired (there is still current for the system of the mobile electronic device to operate), the DIODE OR 54 selects a power path and transmits the power supplied by this path to continually power the system 12.

The DIODE OR 54 acts as a switch to select whether the system 12 receives its power from the LDO regulator 50 power path or the battery charger 52 power path. The DIODE OR 54 simply selects the higher of the two inputs as the power path. In one example, the LDO regulator is a 3.3V LDO regulator 50 so the DIODE OR 54 selects power from the LDO regulator 50 until the output voltage from the BAT port 70 reaches a level of 3.3 V. The output voltage from the BAT port 70 may be boosted by a voltage booster to increase the output of the BAT port 70 in order for the battery charger power path to be selected as the power path in a faster time period. The voltage from the battery charger 52 may be selected as the power path for the system 12, however, until the output voltage from the BAT port 70 of the battery charger 52 reaches a pre-determined level, the power path provided by the LDO regulator 50 allows the system to power up with little or no delay after USB cable 24 is connected between the USB host 22 and the mobile electronic device 10.

Upon receipt of power from the DIODE OR 54, the system 12 powers up and responds to an enumeration request from the USB host CPU 32 within the USB host 22 via the data lines in the USB cable.

After responding to the enumeration request and sending a reply, a check is preformed to see if enumeration has been acknowledged by the USB host CPU 32.

If enumeration has not been acknowledged, a check is then performed to see if the timer has expired and the step of selecting the power path by the DIODE OR is repeated. If enumeration is acknowledged, the mobile electronic device 10 enters the device charging state. Once the enumeration acknowledgement is received by the system 12, the system transmits the first output 74, in the form of a high state signal, to the CE port 68 instructing the battery charger 52 to remain enabled. The second output 76 is also set to a level high after enumeration.

When a device suspend state request is received by the system 12, the first output 74 is transmitted, in the form of a low state signal, from the system 12 to the CE port 68 of the battery charger 52 to disable the battery charger which, in turn, stops the BAT port 70 from both recharging the battery 16 and providing a power path for the system 12. The system 12 also transmits the second output 76, in the form of a low state signal, to the resistor 64 and the NFET 62 causing the NFET to drain, closing the PFET 56 and disabling the power path between the LDO regulator 50 and the DIODE OR 54. In this manner, there are no power paths entering the DIODE OR 54 and thus, no power provided to either recharge the battery or power up the device allowing the device to enter the device suspend state.

It should be understood that although an LDO regulator has been used as one of the paths for providing power, a switched mode power supply (SMPS) could also be used. Furthermore, this path may also include other current limiting features.

Also, although a DIODE OR has been shown as the switching mechanism, other types of switches could also be used; for example circuits based on FETS or other transistors.

It should be understood that the NFET 62 and the PFET 56 are only one example for implementing a voltage controlled switch and other implementations are contemplated and possible.

Furthermore, the capacitor and the NFET may be replaced by a voltage detector integrated circuit so that the alternate power path is enabled on the rising edge of the VBUS input for a time period of approximately 100 msec and so that the system can receive enumeration acknowledgement from the CPU 32 in the USB host 22 to complete the enumeration process.

Figure 3:
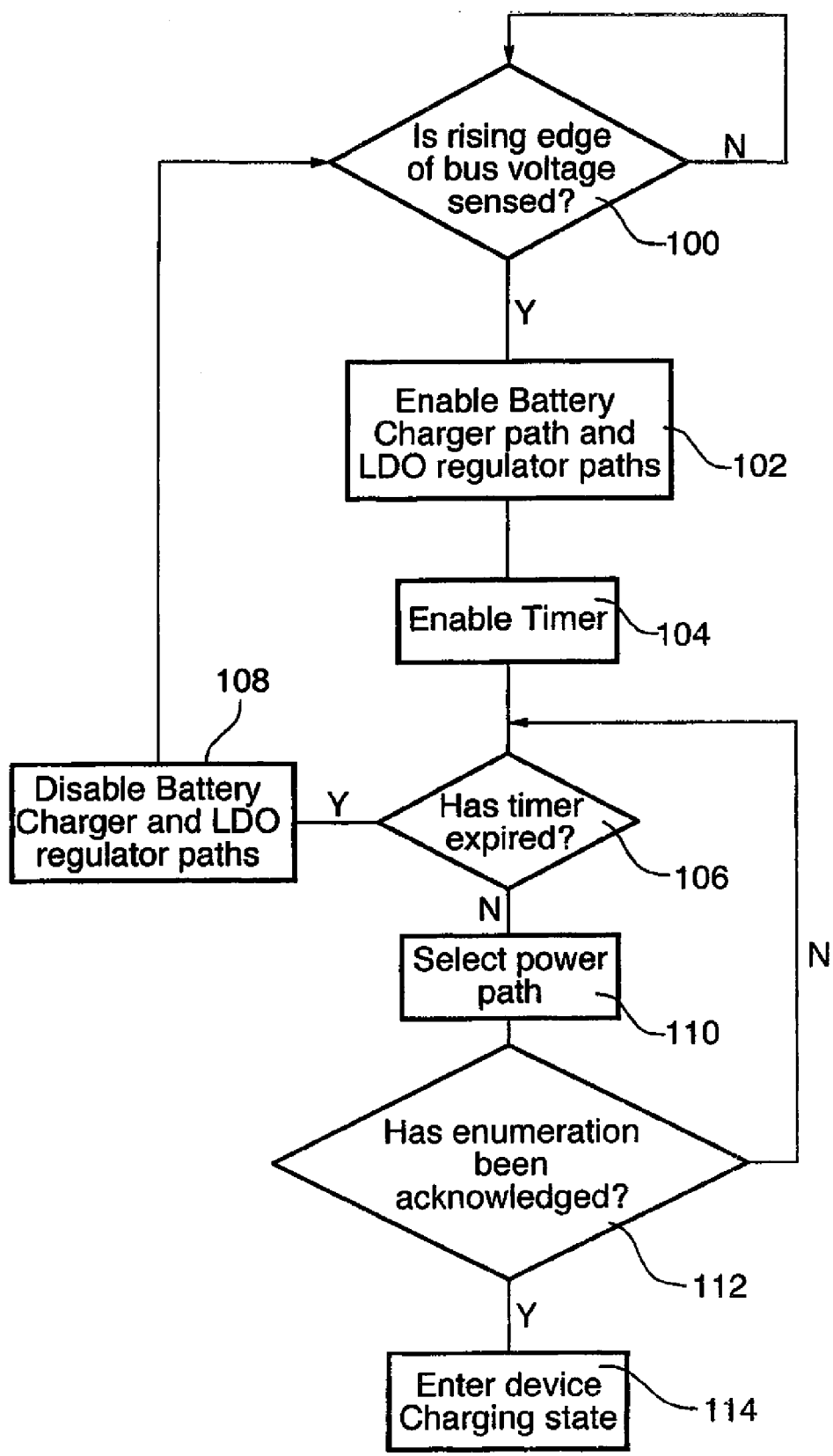
FIG. 3 is a flow diagram of an example method of handling a charging state in a mobile electronic device.

FIG. 3 is a flow diagram of an example method of handling a charging state in a mobile electronic device. At step 100 the mobile device monitors the USB VBUS input for a rising edge. When a rising edge is detected, the method proceeds to step 102 to enable the battery charger path and LDO regulator path. The timer is then enabled at step 104.

The method determines if the timer has expired at step 106. If the timer has expired, then the battery charger and the LDO regulator paths are disabled at step 108, and the method returns to step 100. Else, if the timer has not expired, then the method proceeds to step 110 to select either the LDO or the battery charger as the power path for the mobile device. For example, the DIODE OR 54, described above with reference to FIG. 2, may be used to select the power path with the highest voltage level.

At step 112, the method determines if a USB enumeration has been acknowledged. If not, then the method returns to step 106. Else, if a USB enumeration has been acknowledged, then the device may enter a charging state. For example, with reference to FIG. 2, the BAT output of the battery charger 52 may be enabled causing the DIODE OR 54 to select the BAT output as the power path for the mobile device.

Figure 4:
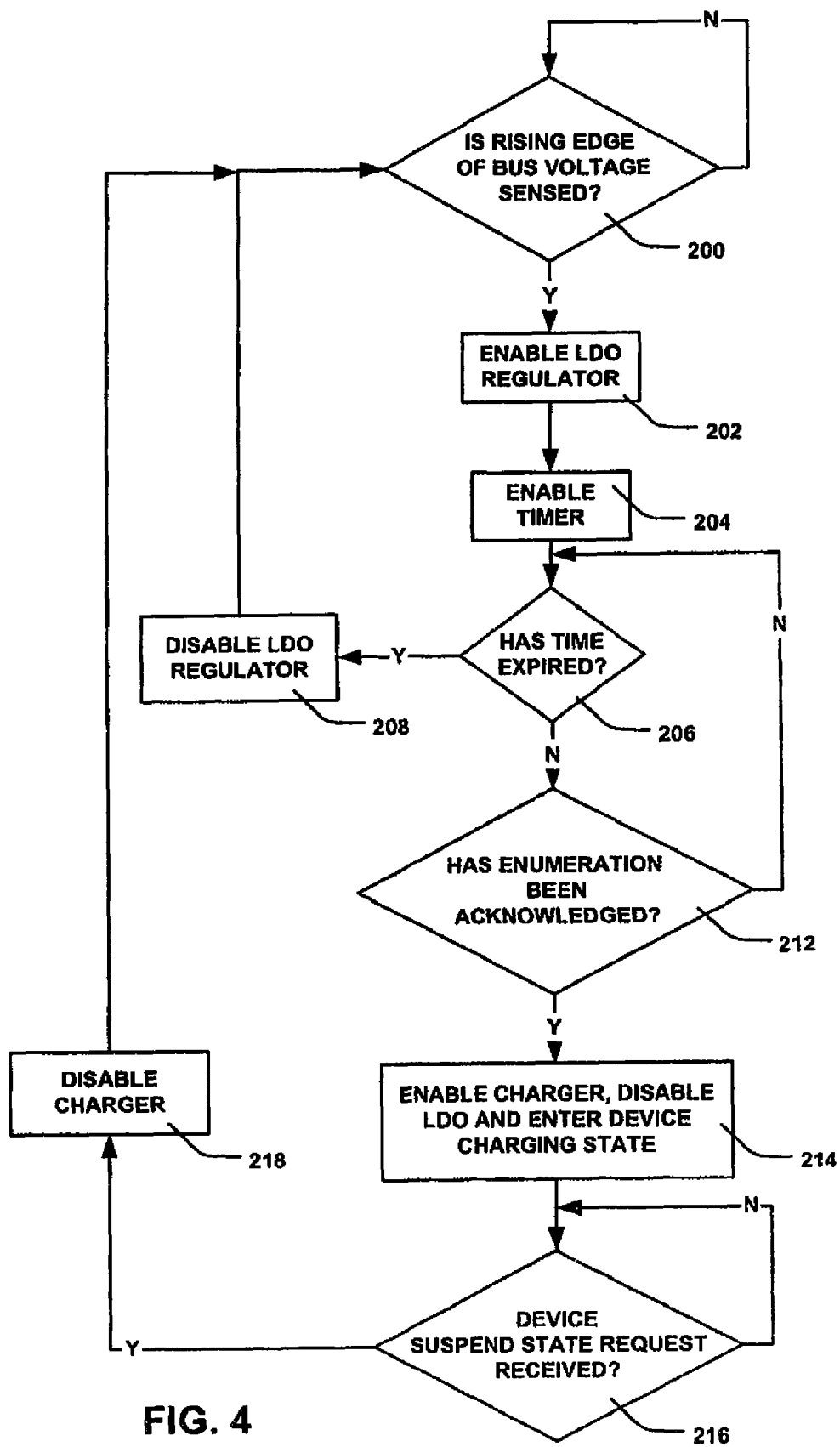
FIG. 4 is a flow diagram of another example method of handling a charging state in a mobile device.

FIG. 4 is a flow diagram of another example method of handling a charging state in a mobile electronic device. At step 200 the mobile device monitors the USB VBUS input for a rising edge. When a rising edge is detected, the method proceeds to step 202 to enable the LDO regulator. While enabled, the LDO regulator may be used to power the mobile device. A timer is then enabled at step 204.

At step 212, the mobile device monitors the USB host for an enumeration acknowledgement. If the timer expires (step 206) before an enumeration acknowledgement has been received form the USB host, then the LDO regulator is disabled at step 208 causing the mobile device to stop drawing power from the USB VBUS, and the method returns to step 200. If enumeration is acknowledged before the timer expires, however, then the method proceeds to step 214 to enable the battery charger, disable the LDO regulator and enter a device charging state.

At step 216, the mobile device monitors the USB host for a device suspend request. If a device suspend request is received, then the charger is disabled at step 218 and the method returns to step 200.

This written description uses examples to disclose the invention, including the best mode, and also to enable a person skilled in the art to make and use the invention. The patentable scope of the invention may include other examples that occur to those skilled in the art.

What is claimed is:

1. A method for using a universal serial bus (USB) interface, the USB interface in a mobile device, the method comprising:

providing a battery charger operable to receive a voltage provided at the USB interface, the battery charger operable for charging a battery in the mobile device, and, a voltage regulator operable to receive a voltage provided at the USB interface, the voltage regulator used in powering the mobile device;

detecting a USB bus voltage at the USB interface;

measuring passage of a predetermined amount of time upon detecting the USB bus voltage; and disabling at least one of the voltage regulator and the battery charger if the predetermined amount of time expires before an enumeration acknowledgement signal is received at the USB interface.

2. The method of claim 1 further comprising:

monitoring the USB interface for a device suspend state request signal;

if the device suspend state request signal is detected, then disabling the voltage regulator and the battery charger.

3. The method of claim 1 further comprising:

while at least one of the voltage regulator and the battery charger are disabled, continuing to receive 500 micro amps from the USB host via the USB interface.

4. The method of claim 1 further comprising:

selecting one of a voltage output of the voltage regulator and a voltage output of the battery charger to power the processing device.

5. The method of claim 1 further comprising:

disabling both the voltage regulator and the battery charger if the predetermined amount of time expires before an enumeration acknowledgement signal is received at the USB interface.

6. The method of claim 1 further comprising:

disabling both the voltage regulator and the battery charger if a device suspend state request signal is received.

7. The method of claim 1 wherein the pre-determined amount of time is an amount of time specified by USB specifications during which the mobile device may be powered from the USB bus voltage without receiving the enumeration acknowledgement signal.

\* \* \* \* \*